United States Patent [19]
Tada et al.

[11] Patent Number: 5,998,975
[45] Date of Patent: Dec. 7, 1999

[54] ELECTRIC POWER SUPPLYING APPARATUS

[75] Inventors: Masahiro Tada, Kanagawa; Hirokazu Ikegami, Tokyo, both of Japan

[73] Assignee: Sony Corporation, Tokyo, Japan

[21] Appl. No.: 08/944,959

[22] Filed: Oct. 7, 1997

[30] Foreign Application Priority Data

Oct. 14, 1996 [JP] Japan .................................. 8-270918

[51] Int. Cl.$^6$ ...................................................... H02P 9/04
[52] U.S. Cl. ................................................. 322/7; 322/25
[58] Field of Search ........................... 322/7, 8, 10, 25, 322/21, 90, 1 R; 290/1 R; 362/192

[56] References Cited

U.S. PATENT DOCUMENTS

| | | | |
|---|---|---|---|
| 4,045,718 | 8/1977 | Gray | 320/17 |
| 4,360,860 | 11/1982 | Johnson et al. | 362/192 |
| 4,419,618 | 12/1983 | Gretsch | 322/7 |
| 4,692,684 | 9/1987 | Schaeffer | 322/90 |
| 4,701,835 | 10/1987 | Campagnuolo et al. | 362/192 |
| 5,093,583 | 3/1992 | Mashino et al. | 307/10.1 |
| 5,194,800 | 3/1993 | Conzelmann et al. | 322/21 |
| 5,323,102 | 6/1994 | Torii et al. | 322/90 |
| 5,606,244 | 2/1997 | Migdal | 322/7 |
| 5,821,737 | 10/1998 | Schmitz | 322/24 |

*Primary Examiner*—Nicholas Ponomarenko
*Attorney, Agent, or Firm*—Jay H. Maioli

[57] ABSTRACT

An electric power supplying apparatus includes an alternating-current generator having a stator and a rotor, a rotary driving mechanism engaging with a rotor of the alternating-current generator to be rotatable for driving the rotor to rotate so as to put the alternating-current generator in operation for generating electric power, and a voltage to current convertor connected between an output end of the alternating-current generator and a load for supplying the load with the electric power obtained from the alternating-current generator in such a manner that an output voltage of the alternating-current generator is arranged to be relatively high and an output current of the alternating-current generator is arranged to be relatively small.

7 Claims, 12 Drawing Sheets

ELECTRIC POWER SUPPLYING APPARATUS

BACKGROUND OF THE INVENTION

1. Field of the Invention

The present invention relates generally to an electric power supplying apparatus, and more particularly, to an apparatus for supplying a load, such as a secondary battery, a condenser for accumulating electric power and so on, with electric power generated by a generator which has a rotor driven to rotate by a manual rotary driver.

2. Description of the Prior Art

There has been proposed an electronic equipment, such as a portable radio receiver or the like, which is provided with a manual rotary driver and a generator having a rotor and operative to generate electric power when the rotor is driven to rotate by the manual rotary driver. When such an electronic equipment is put into actual use, for example, the manual rotary driver is rotated manually by a user to drive the rotor of the generator to rotate, so that the generator is put to operation for generating electric power. The electric power obtained from the generator is supplied to a secondary battery or a condenser for accumulating electric power, such as an electrical double layer condenser, connected with the generator as a load. The electronic equipment, such as the portable radio receiver or the like, is operative to work with a power source of the secondary battery or the condenser for accumulating electric power in which the electric power from the generator is stored or accumulated.

Since such an electronic equipment containing the generator as mentioned above generates electric power for itself as occasion demands, it can be put into operation without any external power source and without being concerned about consumption of a battery contained therein. Accordingly, it is spontaneously considered that the electronic equipment containing the generator is used for countermeasures against various calamities. For example, under a situation where a commercial electric power supplying system is visited by a calamity, such as a big earthquake, a big fire and so on, and an inconvenience in which it is very difficult to obtain new batteries is raised by the calamity, the electronic equipment containing the generator can be operative to function normally.

Consequently, it is required for the electronic equipment containing the generator to be made portable and easily carried and used with simple operations by a user when a calamity occurs. It is further desirable that the generator contained in the electronic equipment, the manual rotary driver for driving the rotor of the electronic equipment to rotate and a portion for supplying a load provided to the generator with electric power is miniaturized in weight and size so that high efficiency is obtained.

Under such circumstances, a previously proposed electronic equipment containing a generator, for example, a radio receiver containing a generator comprises a direct-current generator, a rotary driving mechanism which can be rotated manually, and an accelerating mechanism for increasing the rotation of the rotary driving mechanism and transmitting the increased rotation of the rotary driving mechanism to the rotor of the direct-current generator. When the rotary driving mechanism is rotated manually, the rotation of the rotary driving mechanism is increased 40 to 50 times by the accelerating mechanism and the increased rotation is transmitted to the rotor of the direct-current generator so as to cause the direct-current generator to generate electric power. The electric power obtained from the direct-current generator is directly supplied to a secondary battery to be stored in the same.

In the radio receiver containing the generator as mentioned above, when the rotary driving mechanism is rotated manually by a user, the rotation of the rotary driving mechanism is increased 40 to 50 times by the accelerating mechanism and transmitted to the rotor of the direct-current generator so as to rotate the same. In this case, since a torque necessary for rotating the rotor of the direct-current generator is relatively large usually, there has been a problem that the user who rotates manually the rotary driving mechanism is required to spend a relatively great deal of labor.

That is, an initial torque necessary for the incipient stage of the rotation of the rotor of the direct-current generator is especially increased by reason that the rotation of the rotary driving mechanism is increased 40 to 50 times by the accelerating mechanism. In addition, since the electric power obtained from the direct-current generator is directly supplied to the load, electric power required by the load is supplied from the direct-current generator in such a manner that the output voltage of the direct-current generator is arranged to be relatively low in consideration of an allowable voltage between the input terminals of the load and the output current of the direct-current generator is arranged to be relatively large. Therefore, the torque necessary for rotating the rotor of the direct-current generator becomes relatively large in response to the relatively large output current of the direct-current generator by reason of the following.

Generally, in a generator having a stator and a rotor, such as the direct-current generator mentioned above, for example, a coil wound on a magnetic core is provided on the stator and a permanent magnet opposite to the magnetic core on which the coil is wound is provided on the rotor. When the permanent magnet provided on the rotor is moved relative to the magnetic core on which the coil is wound, electro motive force is generated in the coil and a current based on the electro motive force flows through the coil to form an output current of the generator on condition that a load is connected with the generator. When the current flows through the coil, the magnetic core on which the coil is wound is magnetized by that current, so that magnetic attractive force and magnetic repulsive force are generated between the magnetic core and the permanent magnet provided on the rotor an electro-magnetic brake acts on the rotor. Accordingly, a torque overcoming the electro-magnetic brake acting on the rotor is necessitated to rotate the rotor. The larger the current flowing through the coil wound on the magnetic core, namely, the output current of the generator is, the larger the electro-magnetic brake acting on the rotor becomes. Consequently, the larger the output current of the generator is, the larger the torque necessary for rotating the rotor becomes.

Besides, in the direct-current generator, since the polarity of the output voltage depends on the direction of rotation of the rotor, it is required for the rotary driving mechanism to be accompanied with a device for preventing the rotor from rotating reversely. This results in that the structure of the rotary driving mechanism is complicated.

Further, in the direct-current generator, since the electric power is obtained through a switching rectification by brush elements, noises in generation result from the switching rectification. Therefore, when the radio receiver containing the direct-current generator is put to operation for receiving a radio broadcasting signal under a condition in which the direct-current generator is operating to generate electric power, undesirable noises are mixed in a reproduction output from the radio receiver.

OBJECTS AND SUMMARY OF THE INVENTION

Accordingly, it is an object of the present invention to provide an electric power supplying apparatus for supplying a load, such as a secondary battery, a condenser for accumulating electric power and so on, with electric power generated by a generator which has a rotor driven to rotate by a rotary driving mechanism which comprises, for example, a manual rotary driver rotated manually by a user and an accelerator for increasing the rotation of the manual rotary driver, which avoids the aforementioned disadvantages or problems encountered with the prior art.

Another object of the present invention is to provide an electric power supplying apparatus for supplying a load, such as a secondary battery, a condenser for accumulating electric power and so on, with electric power generated by a generator which has a rotor driven to rotate by a rotary driving mechanism which comprises, for example, a manual rotary driver rotated manually by a user and an accelerator for increasing the rotation of the rotary driving portion, by which a torque necessary for rotating the rotor of the generator can be effectively reduced without bringing about complication in structure on the manual rotary driver.

A further object of the present invention is to provide an electric power supplying apparatus for supplying a load, such as a secondary battery, a condenser for accumulating electric power and so on, with electric power generated by a generator which has a rotor driven to rotate by a rotary driving mechanism which comprises, for example, a manual rotary driver rotated manually by a user and an accelerator for increasing the rotation of the rotary driving portion, which avoids problems resulting from use of a direct-current generator and by which a torque necessary for rotating the rotor of the generator can be effectively reduced.

A still further object of the present invention is to provide an electric power supplying apparatus for supplying a load, such as a secondary battery, a condenser for accumulating electric power and so on, with electric power generated by a generator which has a rotor driven to rotate by a rotary driving mechanism which comprises, for example, a manual rotary driver rotated manually by a user and an accelerator for increasing the rotation of the rotary driving portion, which is suitable for accompanying with a portable electronic equipment, such as a portable radio receiver or the like.

According to the present invention, there is provided an electric power supplying apparatus comprising an alternating-current generator having a stator and a rotor, a rotary driving mechanism engaging with the rotor of the alternating-current generator to be rotatable for driving the rotor to rotate so as to put the alternating-current generator to operation for generating electric power, and a voltage to current convertor connected between an output end of the alternating-current generator and a load for supplying the load with the electric power obtained from the alternating-current generator in such a manner that an output voltage of the alternating-current generator is arranged to be relatively high and an output current of the alternating-current generator is arranged to be relatively small.

The rotary driving mechanism employed in the electric power supplying apparatus according to the present invention comprises, for example, a manual rotary driver rotated manually and an accelerator for increasing the rotation of the manual rotary driver and transmitting the increased rotation of the manual rotary driver to the rotor of the alternating-current generator.

In the electric power supplying apparatus thus constituted in accordance with the present invention, since the alternating-current generator is used, problems resulting from use of a direct-current generator encountered with previously proposed radio receivers containing generators are eliminated. Further, since the electric power obtained from the alternating-current generator is supplied to the load in such a manner that the output voltage of the alternating-current generator is arranged to be relatively high and the output current of the alternating-current generator is arranged to be relatively small by the voltage to current convertor which is connected between the output end of the alternating-current generator and the load, a torque necessary for rotating the rotor of the alternating-generator can be effectively reduced without bringing about complication in structure on the manual rotary driver. Consequently, such a situation that a user who rotates manually the manual rotary driver is required to spend a relatively great deal of labor is avoided.

The above, and other objects, features and advantages of the present invention will be become apparent from the following detailed description taken in conjunction with the accompanying drawings.

DESCRIPTION OF THE PREFERRED EMBODIMENTS

Figure 1:
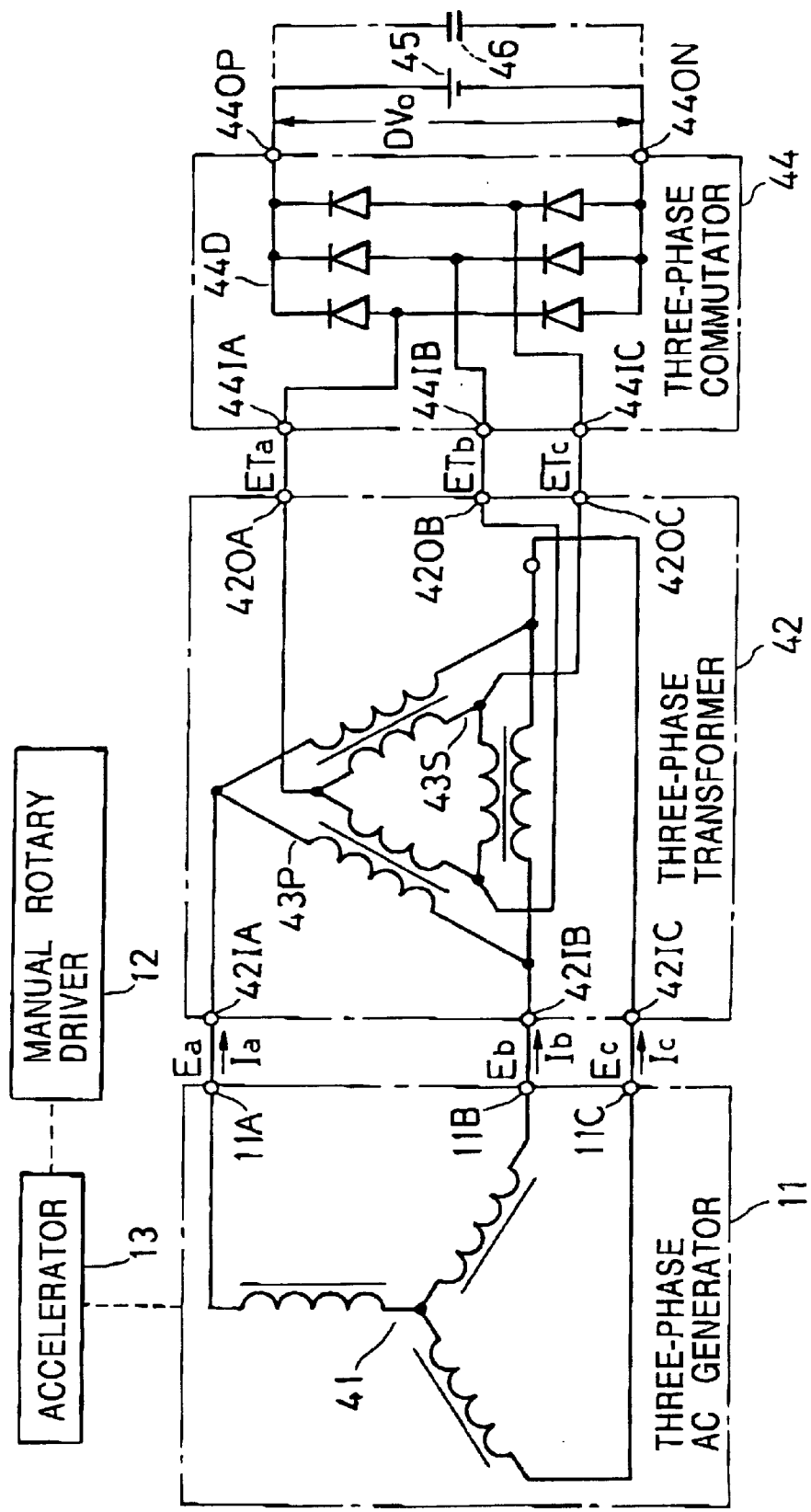
FIG. 1 is a circuit diagram including block indications and showing a first embodiment of electric power supplying apparatus according to the present invention.

FIG. 1 shows a first embodiment of electric power supplying apparatus according to the present invention.

Referring to FIG. 1, the first embodiment comprises a three-phase alternating-current (AC) generator 11, a manual rotary driver 12 and an accelerator 13 engaging with both the three-phase alternating-current generator 11 and the manual rotary driver 12.

The manual rotary driver 12 and the accelerator 13 constitute a rotary driving mechanism for driving a rotor of the three-phase alternating-current generator 11 to rotate so as to put the three-phase alternating-current generator 11 into operation for generating electric power. The manual rotary driver 12 is, for example, rotated manually by a user of the first embodiment and the accelerator 13 is operative to increase the rotation of the manual rotary driver 12 and to transmit the increased rotation of the manual rotary driver 12 to the rotor of the three-phase alternating-current generator 11 for driving the same.

Figure 2:
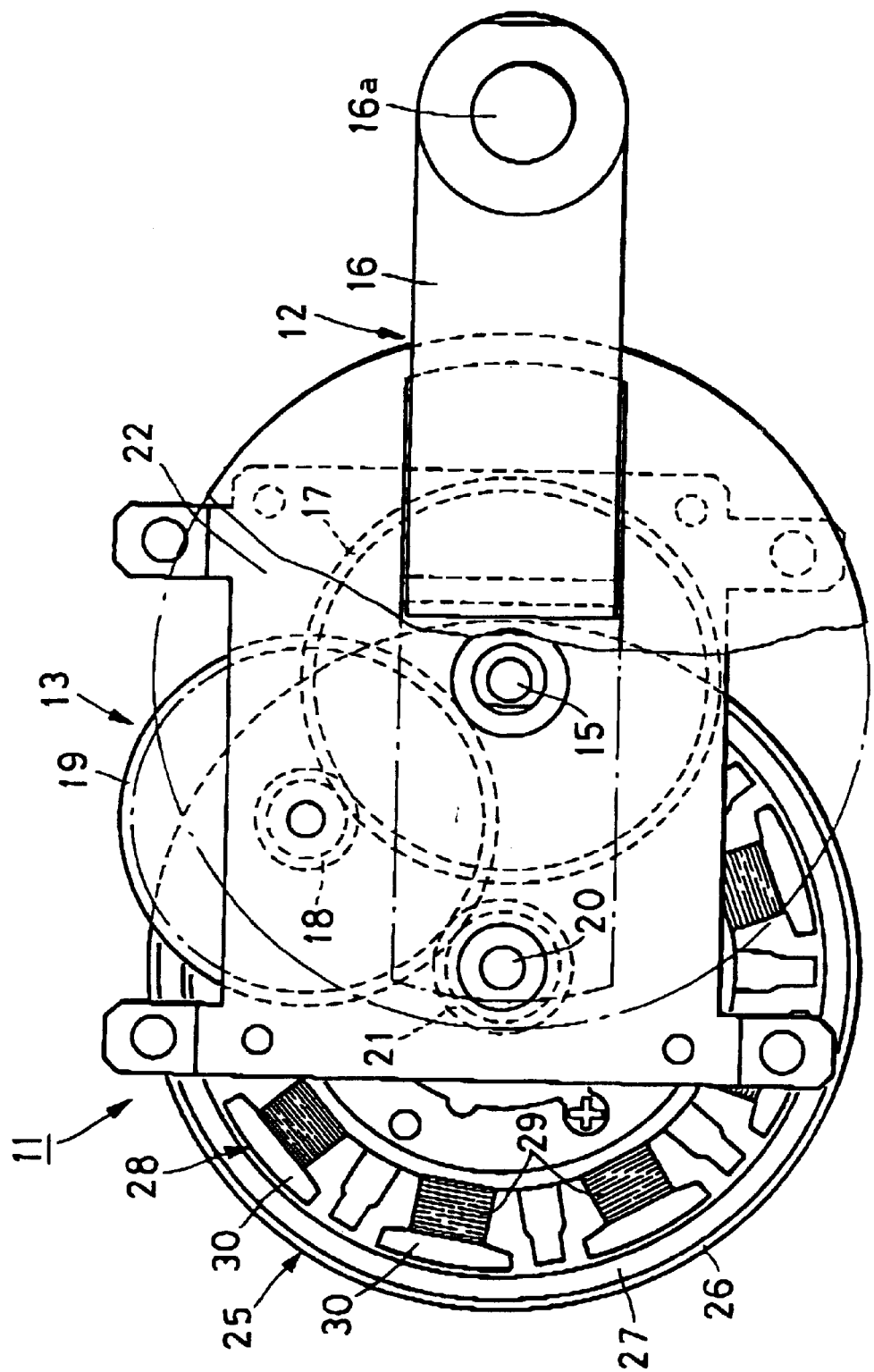
FIG. 2 is a plan view showing a set of concrete examples of a three-phase alternating-current generator, a manual rotary driver and an accelerator employed in an embodiment of electric power supplying apparatus according to the present invention.
Figure 3:
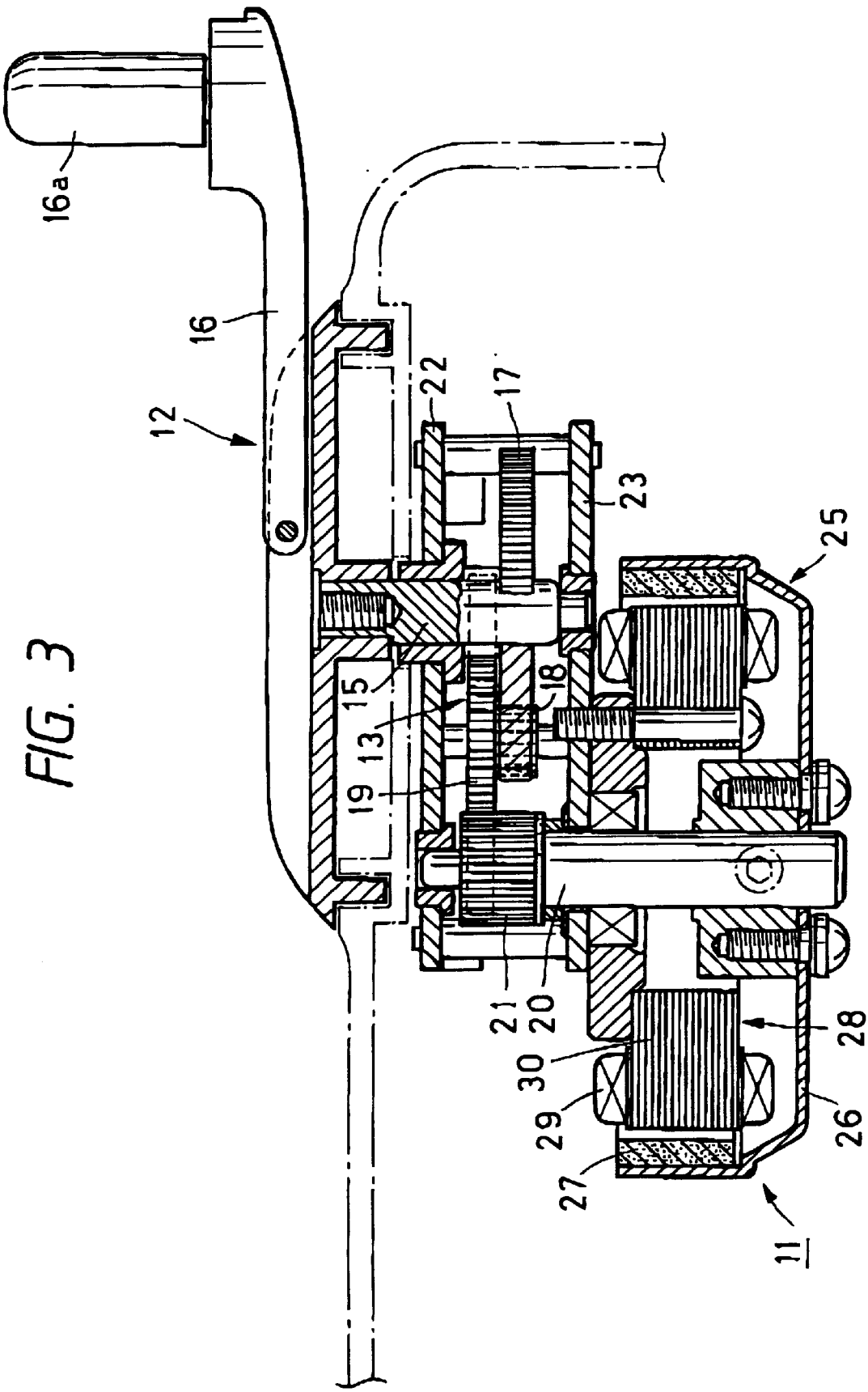
FIG. 3 is a schematic cross-sectional view showing a set of concrete examples of a three-phase alternating-current generator, a manual rotary driver and an accelerator employed in an embodiment of electric power supplying apparatus according to the present invention.
Figure 4:
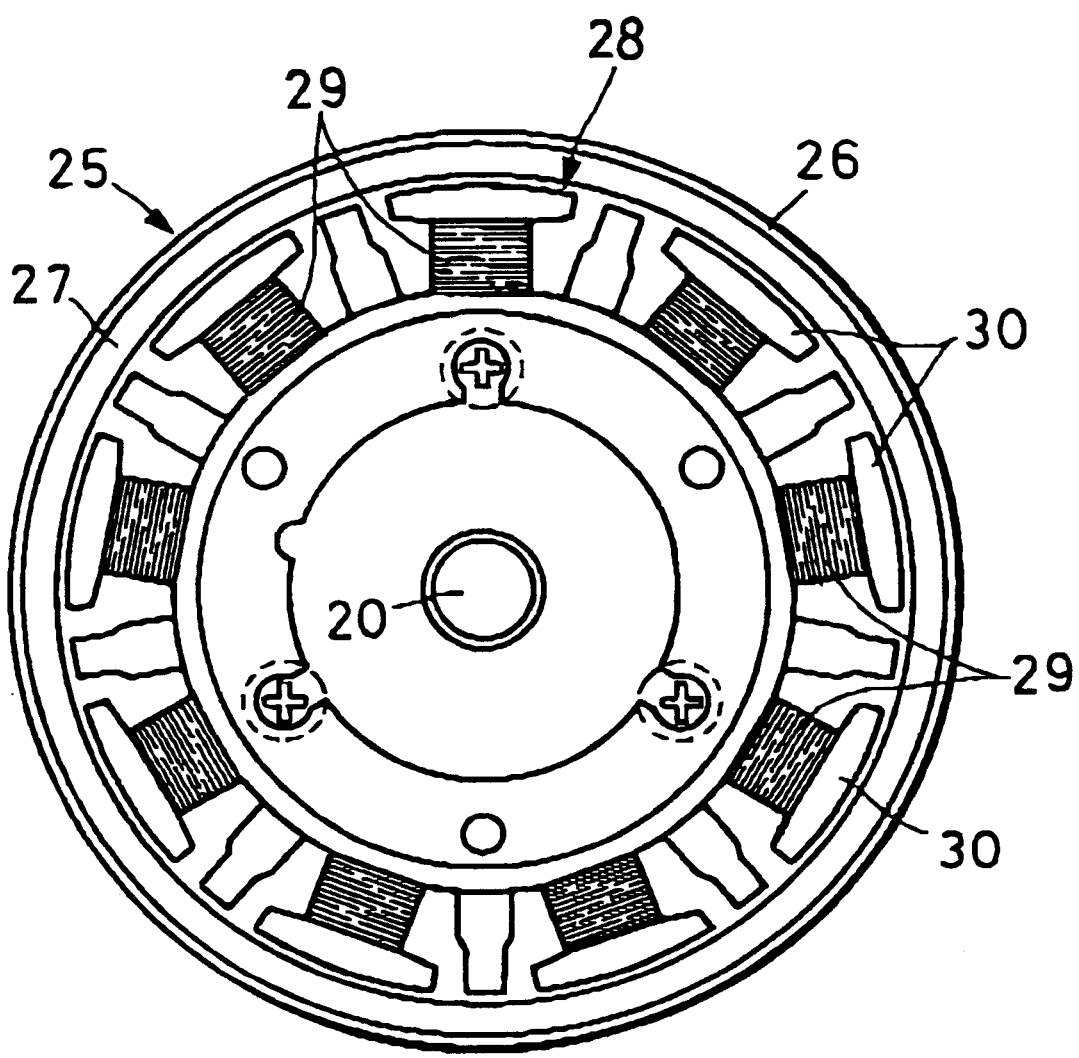
FIG. 4 is a schematic cross-sectional view showing a concrete example of a three-phase alternating-current generator employed in an embodiment of electric power supplying apparatus according to the present invention.

FIGS. 2, 3 and 4 show a set of concrete examples of the three-phase alternating-current generator 11, the manual rotary driver 12 and the accelerator 13. In the concrete examples shown in FIGS. 2, 3 and 4, the manual rotary driver 12 comprises a rotary axis 15 and a handle 16 mounted on the end of the rotary axis 15. A gear 17 is also mounted on the rotary axis 15 to engage with a gear 18. The gear 18 is coaxially incorporated with a gear 19 which engages with a gear 21 mounted on a rotary axis 20. The rotary axes 15 and 20 and the axis common to the gears 18 and 19 are supported by fixed supporting members 22 and 23. The gears 17, 18, 19 and 21 in the aggregate constitute the accelerator 13.

The rotary axis 20 forms a rotary shaft of the three-phase alternating-current generator 11 and a rotor 25 of the three-phase alternating-current generator 11 is mounted on the rotary axis 20. The rotor 25 comprises a cup-shaped rotary supporting member 26 and a ring magnet 27 attached to the inner surface of a cylindrical portion of the cup-shaped rotary supporting member 26.

A stator 28 of the three-phase alternating-current generator 11, which is fixed on the fixed supporting member 23, is positioned to surround the rotary axis 20 at the inside of the ring magnet 27 of the rotor 25. The stator 28 has a plurality of stator coils 29 arranged at regular intervals in a circle with the rotary axis 20 at the center, as shown in FIG. 4. A magnetic pole portion of each of magnetic cores 30 on which the stator coils 29 are wound, respectively, is positioned to face the inner surface of the ring magnet 27 of the rotor 25 with a small magnetic gap therebetween. The rotary axis 20, the rotor 25 mounted on the rotary axis 20 and the stator 28 fixed on the fixed supporting member 23 thus arranged in the aggregate constitute the three-phase alternating-current generator 11.

When a knob 16a provided on the handle 16 constituting the manual rotary driver 12 is grasped and moved to rotate the handle 16 with the rotary axis 15 as the center by, for example, the user of the first embodiment, the rotation of the rotary axis 15 rotated through the handle 16 is transmitted through the gears 17, 18, 19 and 21 constituting the accelerator 13 to the rotary axis 20 forming the rotary shaft of the three-phase alternating-current generator 11. On this occasion, the gears 17, 18, 19 and 21 are operative to increase the rotation of the rotary axis 15 and to transmit the increased rotation of the rotary axis 15 to the rotary axis 20. This means that the gears 17, 18, 19 and 21 are operative to increase the rotation of the rotary axis 15 and to transmit the increased rotation of the rotary axis 15 to the rotor 25 of the three-phase alternating-current generator 11 for driving the same to rotate because the rotor 25 is mounted on the rotary axis 20.

When the rotor 25 is rotated, the ring magnet 27 attached to the rotor 25 rotates relatively to the magnetic pole portions of the magnetic cores 30 positioned to face the inner surface of the ring magnet 27 with the small magnetic gap therebetween. With such movement of the ring magnet 27, electro motive force is generated in each of the stator coils 29 wound on the magnetic cores 30, respectively, and the three-phase alternating-current generator 11 is put to operation for generating electric power including three-phase voltages and currents. Such an operation for generating electric power of the three-phase alternating-current generator 11 continues during the rotation of the handle 16 constituting the manual rotary driver 12.

Figure 5:
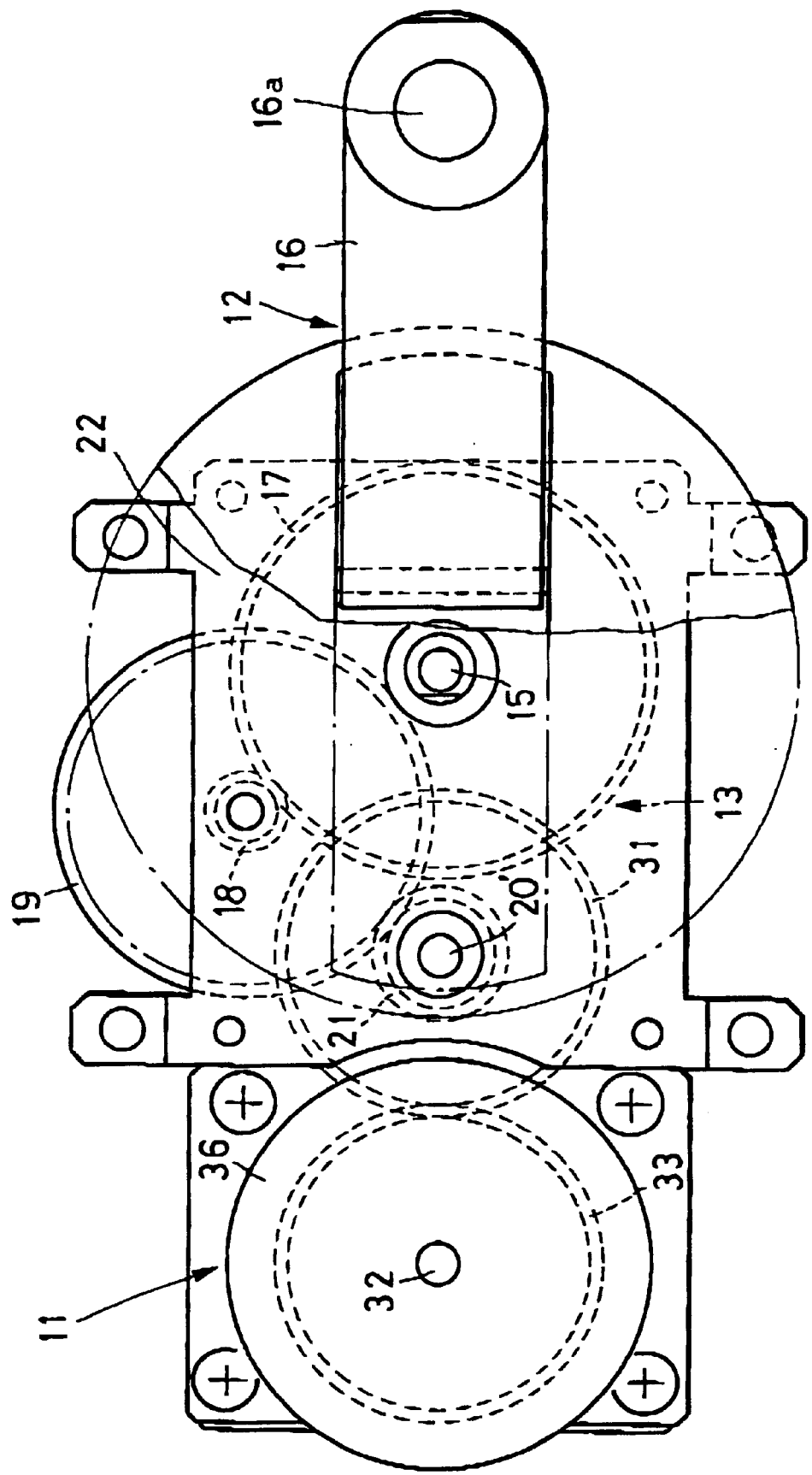
FIG. 5 is a plan view showing another set of concrete examples of a three-phase alternating-current generator, a manual rotary driver and an accelerator employed in an embodiment of electric power supplying apparatus according to the present invention.
Figure 6:
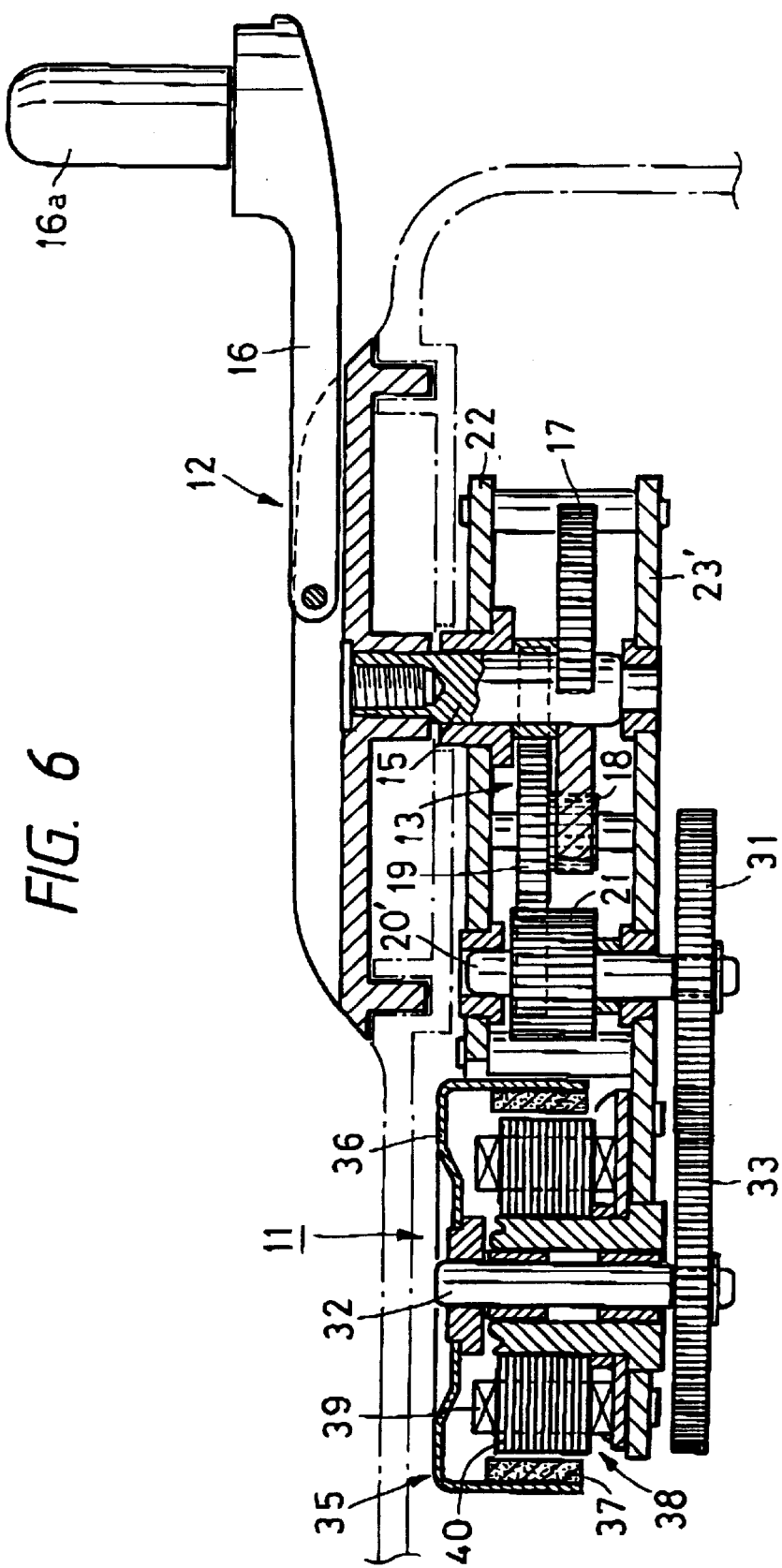
FIG. 6 is a schematic cross-sectional view showing another set of concrete examples of a three-phase alternating-current generator, a manual rotary driver and an accelerator employed in an embodiment of electric power supplying apparatus according to the present invention.
Figure 7:
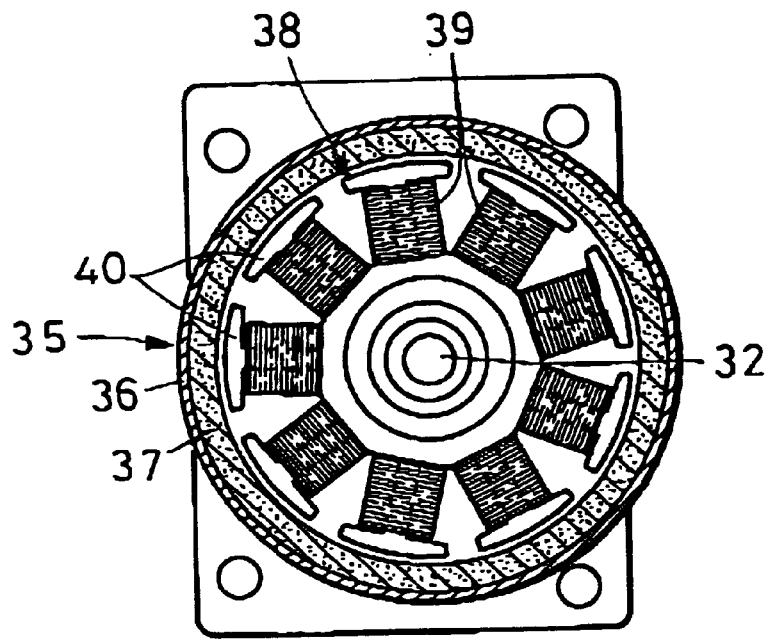
FIG. 7 is a schematic cross-sectional view showing another concrete example of a three-phase alternating-current generator employed in an embodiment of electric power supplying apparatus according to the present invention.

FIGS. 5, 6 and 7 show another set of concrete examples of the three-phase alternating-current generator 11, the manual rotary driver 12 and the accelerator 13. In the concrete examples shown in FIGS. 5, 6 and 7 also, the manual rotary driver 12 comprises a rotary axis 15 and a handle 16 mounted on the end of the rotary axis 15. A gear 17 is also mounted on the rotary axis 15 to engage with a gear 18. The gear 18 is coaxially incorporated with a gear 19 which engages with a gear 21 mounted on a rotary axis 20'.

A gear 31 is also mounted on the rotary axis 20' to rotate together with the gear 19. The gear 31 is engaging with a gear 33 mounted on an rotary axis 32. The rotary axes 15 and 20' and the axis common to the gears 18 and 19 are supported by fixed supporting members 22 and 23'. The rotary axis 32 is supported by fixed supporting member 23'. The gears 17, 18, 19, 21, 31 and 33 in the aggregate constitute the accelerator 13.

The rotary axis 32 forms a rotary shaft of the three-phase alternating-current generator 11 and a rotor 35 of the three-phase alternating-current generator 11 is mounted on the rotary axis 32. The rotor 35 comprises a cup-shaped rotary supporting member 36 and a ring magnet 37 attached to the inner surface of a cylindrical portion of the cup-shaped rotary supporting member 36.

A stator 38 of the three-phase alternating-current generator 11, which is fixed on the fixed supporting member 23', is positioned to surround the rotary axis 32 at the inside of the ring magnet 37 of the rotor 35. The stator 38 has a plurality of stator coils 39 arranged at regular intervals in a circle with the rotary axis 32 at the center, as shown in FIG. 7. A magnetic pole portion of each of magnetic cores 40 on which the stator coils 39 are wound, respectively, is positioned to face the inner surface of the ring magnet 37 of the rotor 35 with a small magnetic gap therebetween. The rotary axis 32, the rotor 35 mounted on the rotary axis 32 and the stator 38 fixed on the fixed supporting member 23' thus arranged in the aggregate constitute the three-phase alternating-current generator 11.

When a knob 16*a* provided on the handle 16 constituting the manual rotary driver 12 is grasped and moved to rotate the handle 16 with the rotary axis 15 as the center by, for example, a user of the first embodiment, the rotation of the rotary axis 15 rotated through the handle 16 is transmitted through the gears 17, 18, 19, 21, 31 and 33 constituting the accelerator 13 to the rotary axis 32 forming the rotary shaft of the three-phase alternating-current generator 11. On this occasion, the gears 17, 18, 19, 21, 31 and 33 are operative to increase the rotation of the rotary axis 15 and to transmit the increased rotation of the rotary axis 15 to the rotary axis 32. This means that the gears 17, 18, 19, 21, 31 and 33 are operative to increase the rotation of the rotary axis 15 and to transmit the increased rotation of the rotary axis 15 to the rotor 35 of the three-phase alternating-current generator 11 for driving the same to rotate because the rotor 35 is mounted on the rotary axis 32.

When the rotor 35 is rotated, the ring magnet 37 attached to the rotor 35 rotates relatively to the magnetic pole portions of the magnetic cores 40 positioned to face the inner surface of the ring magnet 37 with the small magnetic gap therebetween. With such movement of the ring magnet 37, electro motive force is generated in each of the stator coils 39 wound on the magnetic cores 40, respectively, and the three-phase alternating-current generator 11 is put to operation for generating electric power including three-phase voltages and currents. Such an operation for generating electric power of the three-phase alternating-current generator 11 continues during the rotation of the handle 16 constituting the manual rotary driver 12.

In the first embodiment comprising the three-phase alternating-current generator 11, the manual rotary driver 12 and the accelerator 13 as shown in FIG. 1, a plurality of stator coils of the three-phase alternating-current generator 11 are connected with one another to form a star connection 41 and three-phase voltages Ea, Eb and Ec, which are output voltages obtained based on the electric power generated by the three-phase alternating-current generator 11, are induced respectively to output terminals 11A, 11B and 11C to which the star connection 41 is connected. The three-phase voltages Ea, Eb and Ec obtained at the output terminals 11A, 11B and 11C of the three-phase alternating-current generator 11 are supplied to input terminals 42IA, 42IB and 42IC of a three-phase transformer 42.

The three-phase transformer 42 comprises primary coils connected with each other to form a delta connection 43P and secondary coils connected with each other to form a delta connection 43S. The delta connection 43P formed by the primary coils is connected to the input terminals 42IA, 42IB and 42IC and the delta connection 43S formed by the secondary coils is connected to output terminals 420A, 420B and 420C. The ratio of the primary coil to the secondary coil is selected to be N to 1 (N>1) and therefore an alternating-voltage being 1/N lower than an alternating-voltage at the primary coil is induced to the secondary coil. Accordingly, three-phase voltages ETa, ETb and ETc which are obtained by reducing the three-phase voltages Ea, Eb and Ec supplied to the input terminals 42IA, 42IB and 42IC of the three-phase transformer 42 are induced to the output terminals 420A, 420B and 420C of the three-phase transformer 42, respectively.

The three-phase voltages ETa, ETb and ETc obtained at the output terminals 420A, 420B and 420C of the three-phase transformer 42, respectively, are supplied to input terminals 44IA, 44IB and 44IC of a three-phase commutator 44, respectively. In the three-phase commutator 44, each of the three-phase voltages ETa, ETb and ETc from the three-phase transformer 42 is commutated by a group of diodes 44D to produce a direct-current (DC) voltage DVo between a positive output terminal 440P and a negative output terminal 440N.

Positive and negative terminals of a secondary battery 45 or positive and negative terminals of a condenser 46 for accumulating electric power as shown with dot and dash lines in FIG. 1 are connected to the positive and negative output terminals 440P and 440N of the three-phase commutator 44, respectively. The direct-current voltage DVo obtained between the positive and negative output terminals 440P and 440N of the three-phase commutator 44 and a direct-current caused by the direct-current voltage DVo are supplied to the secondary battery 45 or the condenser 46 for accumulating electric power and subjected to charge therein.

The three-phase transformer 42 and the three-phase commutator 44 constitute a voltage to current convertor relative to the three-phase voltages Ea, Eb and Ec which are the output voltages induced respectively at the output terminals 11A, 11B and 11C of the three-phase alternating-current generator 11 based on the electric power generated by the three-phase alternating-current generator 11 and three-phase currents Ia, Ib and Ic which are output currents caused respectively by the three-phase voltages Ea, Eb and Ec to flow through the output terminals 11A, 11B and 11C of the three-phase alternating-current generator 11. The secondary battery 45 or the condenser 46 for accumulating electric power constitutes a load of the three-phase alternating-current generator 11. Accordingly, the voltage to current convertor comprising the three-phase transformer 42 and the three-phase commutator 44 is connected between the output terminals 11A, 11B and 11C of the three-phase alternating-current generator 11 and the load constituted by the secondary battery 45 or the condenser 46 for accumulating electric power.

Figure 8:
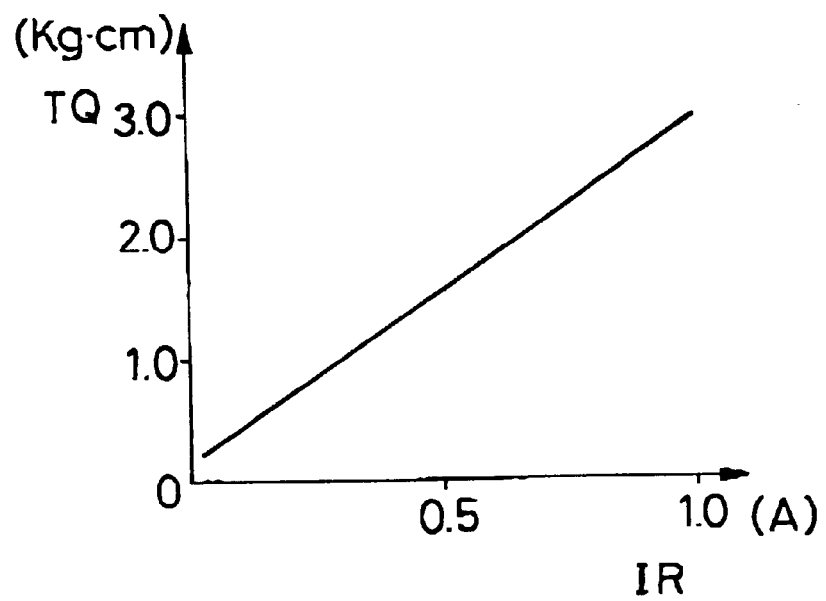
FIG. 8 is a characteristic chart used for explaining a three-phase alternating-current generator employed in an embodiment of electric power supplying apparatus according to the present invention.

In the first embodiment shown in FIG. 1, the smaller each of the three-phase currents Ia, Ib and Ic flowing as the output currents through the output terminals 11A, 11B and 11C of the three-phase alternating-current generator 11 is, the smaller a torque necessary for rotating the rotor (for example, the rotor 25 or 35 shown in FIGS. 3, 4, 6 and 7) of the three-phase alternating-current generator 11, which results from the electro-magnetic brake caused between the magnetic core of the stator (for example, the stator 28 or 38 shown in FIGS. 3, 4, 6 and 7) magnetized by the current flowing through the stator coil wound on the magnetic core and the ring magnet of the rotor to act on the rotor, is. Such a relation between the output current and the torque necessary for rotating the rotor is one of general characteristics of a generator having a stator and a rotor. FIG. 8 shows one example of the relation between the output current of the three-phase alternating-current generator 11 and the torque necessary for rotating the rotor of the three-phase alternating-current generator 11 on a characteristic chart having an abscissa indicating a value IR of a direct current obtained by commutating the output current and an ordinate axis indicating a torque TQ necessary for rotating the rotor. According to the relation shown in FIG. 8, it is understood that the torque necessary for rotating the rotor increases linearly in proportion to increase in the output current.

Figure 9:
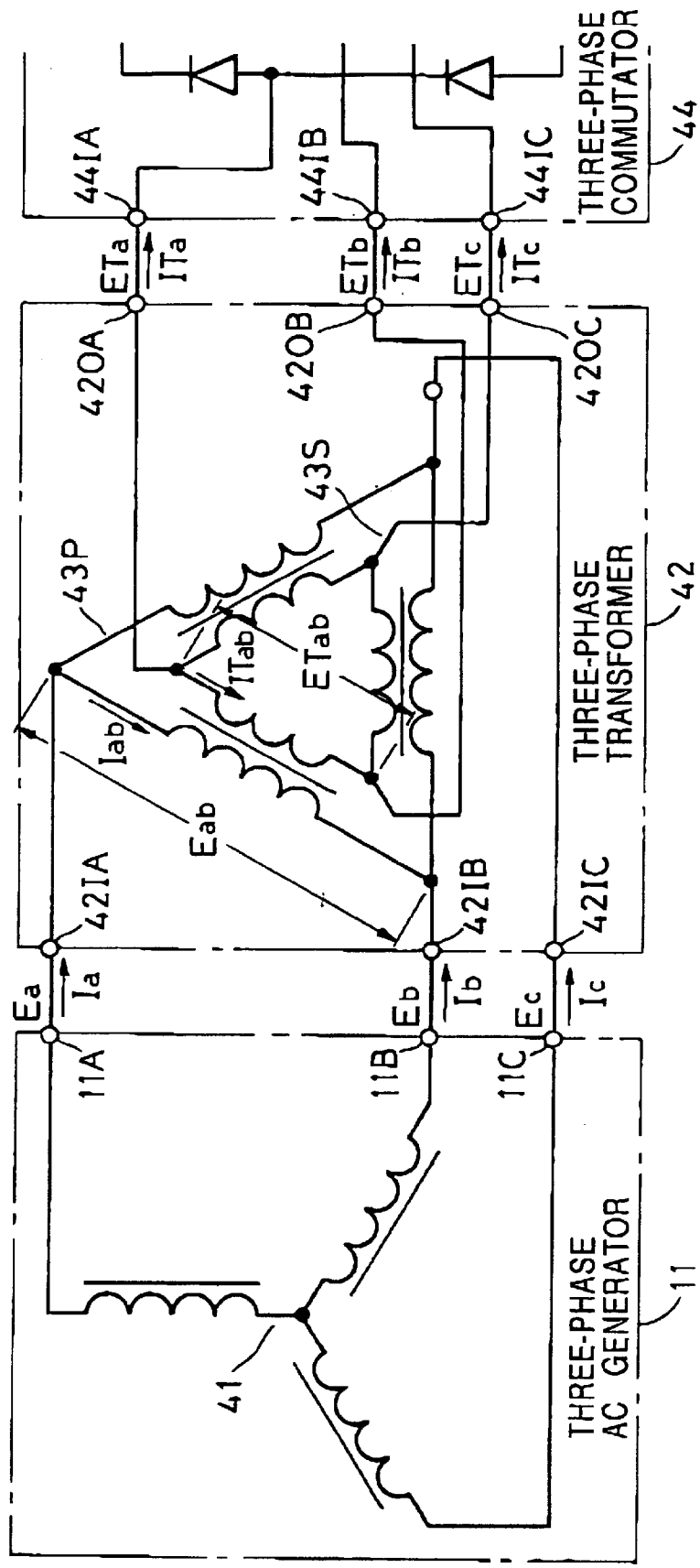
FIG. 9 is a circuit diagram used for explaining a three-phase alternating-current generator and a three-phase transformer employed in an embodiment of electric power supplying apparatus according to the present invention.

On condition that three-phase currents ITa, ITb and ITc flow through the output terminals 420A, 420B and 420C of the three-phase transformer 42, respectively, as shown in FIG. 9, the value of each of the three-phase voltages Ea, Eb and Ec, the value of each of the three-phase voltages ETa, ETb and ETc, the value of each of the three-phase currents Ia, Ib and Ic, and the value of each of the three-phase currents ITa, ITb and ITc are in due consideration below.

The value of each of the three-phase voltages ETa, ETb and ETc which are induced respectively to the output terminals 420A, 420B and 420C of the three-phase transformer 42 to be supplied to the input terminals 441A, 441B and 441C of the three-phase commutator 44, respectively, and the value of each of the three-phase currents ITa, ITb and ITc which flow through the output terminals 420A, 420B and 420C of the three-phase transformer 42, respectively, and further through the input terminals 441A, 441B and 441C of the three-phase commutator 44, respectively, are determined in compliance with requirements on the load of the three-phase alternating-current generator 11 which is constituted by the secondary battery 45 or the condenser 46 for accumulating electric power. In case of the embodiment shown in FIG. 9, it is supposed that the value of each of the three-phase voltages ETa, ETb and ETc having been determined in compliance with requirements on the load of the three-phase alternating-current generator 11 is Vet and the value of each of the three-phase currents ITa, ITb and ITc having been determined in compliance with requirements on the load of the three-phase alternating-current generator 11 is Ait.

In addition, it is supposed that a voltage across one of the primary coils forming the delta connection 43P of the three-phase transformer 42, which is connected between the input terminals 421A and 421B, is Eab having its value of Vab and a current flowing through the primary coil connected between the input terminals 421A and 421B is Iab having its value of Aab. It is further supposed that a voltage across one of the secondary coils forming the delta connection 43S of the three-phase transformer 42, which is connected between the output terminals 420A and 420B, is ETab having its value of VTab and a current flowing through the secondary coil connected between the output terminals 420A and 420B is ITab having its value of ATab.

The voltage ETab induced to the secondary coil connected between the output terminals 420A and 420B is in proportion to the three-phase voltage ETa and therefore the value VTab of the voltage ETab is determined based on the value Vet of the three-phase voltage ETa. The current ITab flowing through the secondary coil connected between the output terminals 420A and 420B is in proportion to the three-phase current ITa flowing through the output terminal 420A of the three-phase transformer 42 and therefore the value ATab of the current ITab is determined based on the value Ait of the three-phase current ITa.

The ratio of the primary coil to the secondary coil is selected to be N to 1 in the three-phase transformer 42 as aforementioned and therefore the value Vab of the voltage Eab supplied to the primary coil connected between the input terminals 421A and 421B is N times larger than the value VTab of the voltage ETab (Vab=N·VTab). Since conversion loss between the primary and secondary coils of the three-phase transformer 42 can be substantially neglected, the value Vab of the voltage Eab, the value Aab of the current Iab, the value VTab of the voltage ETab and the value ATab of the current ITab satisfy the following relation:

$$Vab \cdot Aab = VTab \cdot ATab$$

Accordingly, the following equations are also satisfied:

$$Aab = VTab \cdot ATab / Vab$$
$$= VTab \cdot ATab / N \cdot VTab$$
$$= ATab / N$$

This means that the value Aab of the current Iab is 1/N smaller than the value ATab of the current ITab.

The voltage Eab is in proportion to the three-phase voltage Ea and the current Iab is in proportion to the three-phase current Ia. Accordingly, the value of the three-phase voltage Ea derived to the output terminal 11A of the three-phase alternating-current generator 11 is N times the value Vet of the three-phase voltage ETa supplied to the input terminal 441A of the three-phase commutator 44 and the value of the three-phase current Ia flowing through the output terminal 11A of the three-phase alternating-current generator 11 is 1/N smaller than the value Ait of the three-phase current ITa flowing through the input terminal 441A of the three-phase commutator 44.

Similarly, the value of the three-phase voltage Eb derived to the output terminal 11B of the three-phase alternating-current generator 11 is N times the value Vet of the three-phase voltage ETb supplied to the input terminal 441B of the three-phase commutator 44 and the value of the three-phase current Ib flowing through the output terminal 11B of the three-phase alternating-current generator 11 is 1/N times the value Ait of the three-phase current ITb flowing through the input terminal 441B of the three-phase commutator 44. Further, the value of the three-phase voltage Ec derived at the output terminal 11C of the three-phase alternating-current generator 11 is N times the value Vet of the three-phase voltage ETc supplied to the input terminal 441C of the three-phase commutator 44 and the value of the three-phase current Ic flowing through the output terminal 11C of the three-phase alternating-current generator 11 is 1/N times the value Ait of the three-phase current ITc flowing through the input terminal 441C of the three-phase commutator 44.

As described above, with the three-phase transformer 42, the value of each of the three-phase voltages Ea, Eb and Ec induced as the output voltages to the output terminals 11A, 11B and 11C of the three-phase alternating-current generator 11 has N-fold increase and the value of each of the three-phase currents Ia, Ib and Ic flowing as the output currents through the output terminals 11A, 11B and 11C of the three-phase alternating-current generator 11 has 1/N-fold reduction, compared with a case where the input terminals 441A, 441B and 441C of the three-phase commutator 44 are directly coupled with the output terminals 11A, 11B and 11C of the three-phase alternating-current generator 11, respectively, so that the three-phase voltages each having the value Vet are supplied to the input terminals 441A, 441B and 441C of the three-phase commutator 44, respectively, and the three-phase currents each having the value Ait flow through the input terminals 441A, 441B and 441C of the three-phase commutator 44, respectively.

Consequently, the voltage to current convertor which comprises the three-phase transformer 42 and the three-phase commutator 44 and is connected between the output terminals 11A, 11B and 11C of the three-phase alternating-current generator 11 and the load constituted by the secondary battery 45 or the condenser 46 for accumulating electric power, is operative to supply the load constituted by the secondary battery 45 or the condenser 46 for accumulating electric power with the electric power obtained from the three-phase alternating-current generator 11 in such a manner that each of the three-phase voltages Ea, Eb and Ec induced as the output voltages to the output terminals 11A, 11B and 11C of the three-phase alternating-current generator 11 is arranged to be relatively high and each of the three-phase currents Ia, Ib and Ic flowing as the output currents through the output terminals 11A, 11B and 11C of the three-phase alternating-current generator 11 is arranged to be relatively small.

As aforementioned, in the three-phase alternating-current generator 11, the smaller each of the three-phase currents Ia, Ib and Ic flowing as the output currents through the output terminals 11A, 11B and 11C of the three-phase alternating-current generator 11 is, the less torque necessary for rotating the rotor (for example, the rotor 25 or 35 shown in FIGS. 3, 4, 6 and 7) of the three-phase alternating-current generator 11. Accordingly, in the first embodiment shown in FIG. 1, since each of the three-phase currents Ia, Ib and Ic flowing as the output currents through the output terminals 11A, 11B and 11C of the three-phase alternating-current generator 11 is arranged to be relatively small, such as to have 1/N reduction compared with the case where the three-phase transformer 42 is not employed, the torque necessary for rotating the rotor 25 or 35 of the three-phase alternating-current generator 11 is effectively reduced. As a result, such a situation that the user who manually rotates the manual rotary driver 12 so as to rotate the rotor 25 or 35 of the three-phase alternating-current generator 11 is required to spend a relatively great deal of labor is avoided.

Figure 10:
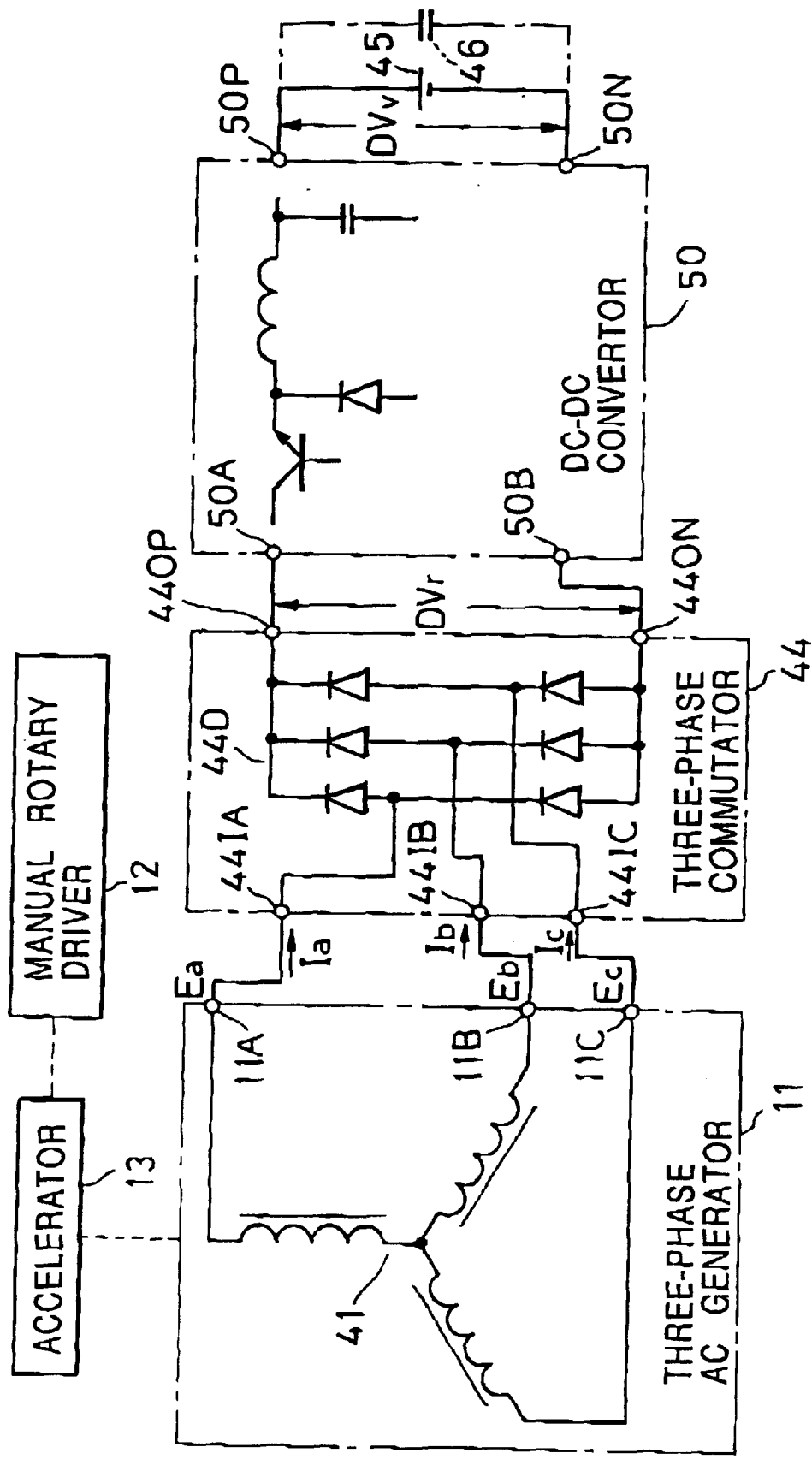
FIG. 10 is a circuit diagram including block indications and showing a second embodiment of electric power supplying apparatus according to the present invention.

FIG. 10 shows a second embodiment of electric power supplying apparatus according to the present invention.

Referring to FIG. 10, the second embodiment also comprises a three-phase alternating-current (AC) generator 11, a manual rotary driver 12 and an accelerator 13 in the same manner as the first embodiment shown in FIG. 1. The concrete embodiments of these three-phase alternating-current generator 11, manual rotary driver 12 and accelerator 13 are shown is FIGS. 2 to 7, as aforementioned.

In the second embodiment shown in FIG. 10, three-phase voltages Ea, Eb and Ec obtained at output terminals 11A, 11B and 11C of the three-phase alternating-current generator 11 to which a star connection 41 formed with a plurality of stator coils of the three-phase alternating-current generator 11 is connected are supplied to input terminals 44IA, 44IB and 44IC of a three-phase commutator 44, respectively. In the three-phase commutator 44, each of the three-phase voltages Ea, Eb and Ec from the three-phase alternating-current generator 11 is commutated by a group of diodes 44D to produce a direct-current (DC) voltage DVr between a positive output terminal 44OP and a negative output terminal 44ON.

The direct-current voltage DVr obtained between the positive and negative output terminals 44OP and 44ON of the three-phase commutator 44 is supplied to input terminals 50A and 50B of a direct-current voltage convertor (DC-DC convertor) 50. In the direct-current voltage convertor 50, the direct-current voltage DVr is converted into a pulse train voltage. The pulse train voltage is subjected to a necessary level adjustment and then converted again into a direct-current voltage DVv having its value smaller than that of the direct-current voltage DVr. The direct-current voltage DVv thus produced is derived between a positive output terminal 50P and a negative output terminal 50N of the direct-current voltage convertor 50.

Positive and negative terminals of a secondary battery 45 or positive and negative terminals of a condenser 46 for accumulating electric power as shown with dot and dash lines in FIG. 10 are connected to the positive and negative output terminals 50P and 50N of the direct-current voltage convertor 50, respectively. The direct-current voltage DVv obtained between the positive and negative output terminals 50P and 50N of the direct-current voltage convertor 50 and a direct-current caused by the direct-current voltage DVv are supplied to the secondary battery 45 or the condenser 46 for accumulating electric power and subjected to charge therein.

The three-phase commutator 44 and the direct-current voltage convertor 50 constitute a voltage to current convertor relative to the three-phase voltages Ea, Eb and Ec which are the output voltages induced respectively at the output terminals 11A, 11B and 11C of the three-phase alternating-current generator 11 based on the electric power generated by the three-phase alternating-current generator 11 and three-phase currents Ia, Ib and Ic which are output currents caused respectively by the three-phase voltages Ea, Eb and Ec to flow through the output terminals 11A, 11B and 11C of the three-phase alternating-current generator 11. The secondary battery 45 or the condenser 46 for accumulating electric power constitutes a load of the three-phase alternating-current generator 11. Accordingly, in the second embodiment shown in FIG. 10, the voltage to current convertor comprising the three-phase commutator 44 and the direct-current voltage convertor 50 is connected between the output terminals 11A, 11B and 11C of the three-phase alternating-current generator 11 and the load constituted by the secondary battery 45 or the condenser 46 for accumulating electric power.

The direct-current voltage convertor 50 is operative to supply the load constituted by the secondary battery 45 or the condenser 46 for accumulating electric power with the electric power required thereby based on the direct-current voltage DVv having the value smaller than that of the direct-current voltage DVr, which is obtained by commutating at the three-phase commutator 44 the three-phase voltages Ea, Eb and Ec induced at the output terminals 11A, 11B and 11C of the three-phase alternating-current generator 11, and the direct-current caused by the direct-current voltage DVv. Accordingly, the value of each of the three-phase voltages Ea, Eb and Ec induced as the output voltages at the output terminals 11A, 11B and 11C of the three-phase alternating-current generator 11 and supplied to the three-phase commutator 44 to produce the direct-current voltage DVr can be arranged to be relatively high and the value of each of the three-phase currents Ia, Ib and Ic flowing as the output currents through the output terminals 11A, 11B and 11C of the three-phase alternating-current generator 11 can be arranged to be relatively small.

Under such a condition, the voltage to current convertor which comprises the three-phase commutator 44 and the direct-current voltage convertor 50 and is connected between the output terminals 11A, 11B and 11C of the three-phase alternating-current generator 11 and the load constituted by the secondary battery 45 or the condenser 46 for accumulating electric power, is operative to supply the load constituted by the secondary battery 45 or the condenser 46 for accumulating electric power with the electric power obtained from the three-phase alternating-current generator 11 in such a manner that each of the three-phase voltages Ea, Eb and Ec induced as the output voltages to the output terminals 11A, 11B and 11C of the three-phase alternating-current generator 11 is arranged to be relatively high and each of the three-phase currents Ia, Ib and Ic flowing as the output currents through the output terminals 11A, 11B and 11C of the three-phase alternating-current generator 11 is arranged to be relatively small.

As aforementioned, in the three-phase alternating-current generator 11, the smaller each of the three-phase currents Ia, Ib and Ic flowing as the output currents through the output terminals 11A, 11B and 11C of the three-phase alternating-current generator 11 is, the less torque necessary for rotating the rotor (for example, the rotor 25 or 35 shown in FIGS. 3, 4, 6 and 7) of the three-phase alternating-current generator 11. Accordingly, in the second embodiment shown in FIG. 10, since each of the three-phase currents Ia, Ib and Ic flowing as the output currents through the output terminals 11A, 11B and 11C of the three-phase alternating-current generator 11 can be arranged to be relatively small, the torque necessary for rotating the rotor 25 or 35 of the three-phase alternating-current generator 11 can be effectively reduced. As a result, such a situation that the user who manually rotates the manual rotary driver 12 so as to rotate the rotor 25 or 35 of the three-phase alternating-current generator 11 is required to spend a relatively great deal of labor is avoided.

Figure 11:
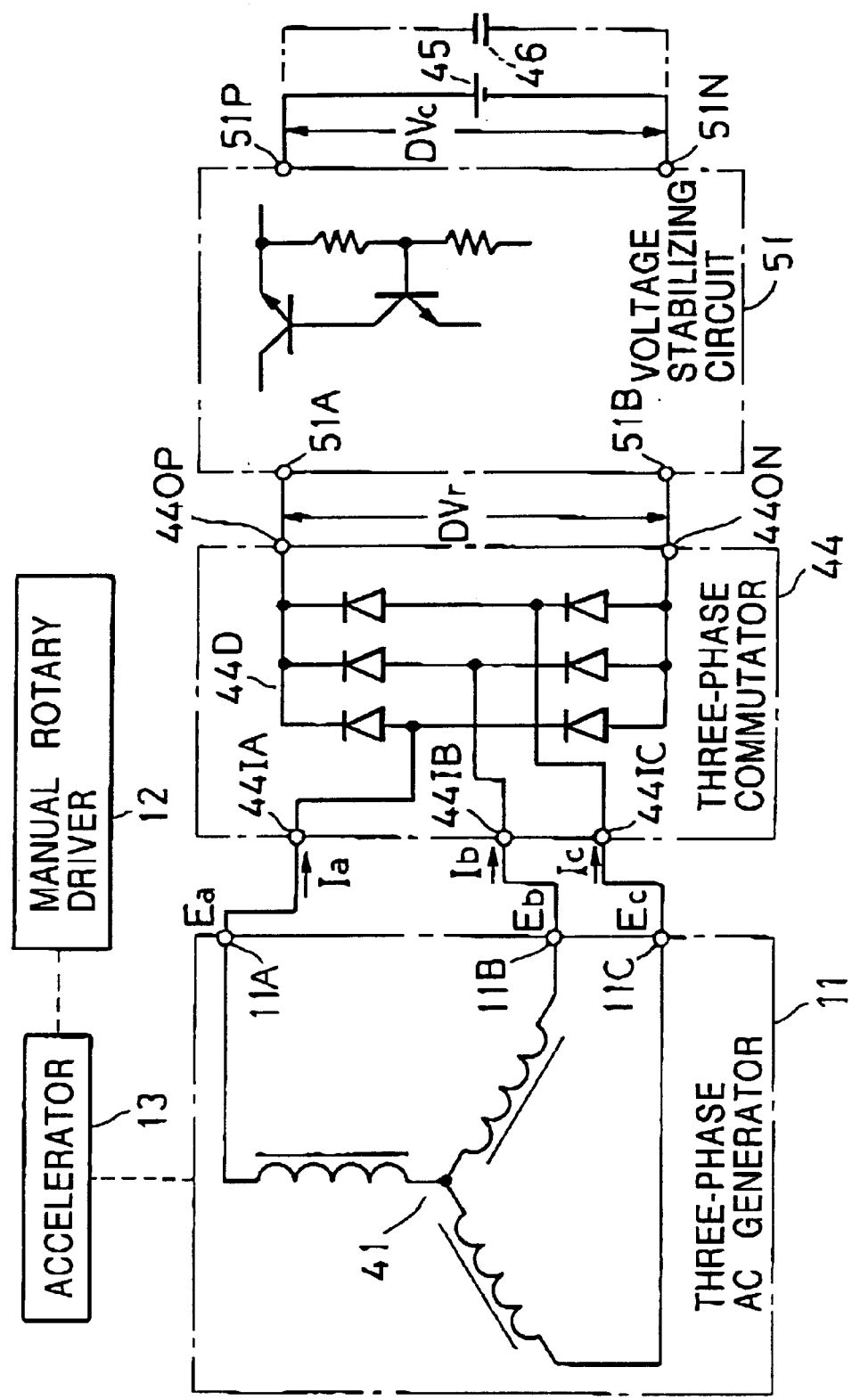
FIG. 11 is a circuit diagram including block indications and showing a third embodiment of electric power supplying apparatus according to the present invention.

FIG. 11 shows a third embodiment of electric power supplying apparatus according to the present invention.

Referring to FIG. 11, the third embodiment also comprises a three-phase alternating-current (AC) generator 11, a manual rotary driver 12 and an accelerator 13 in the same manner as the first embodiment shown in FIG. 1. The concrete embodiments of these three-phase alternating-current generator 11, manual rotary driver 12 and accelerator 13 are shown in FIGS. 2 to 7, as aforementioned.

In the third embodiment shown in FIG. 11, three-phase voltages Ea, Eb and Ec obtained at output terminals 11A, 11B and 11C of the three-phase alternating-current generator 11 to which a star connection 41 formed with a plurality of stator coils of the three-phase alternating-current generator 11 is connected are supplied to input terminals 44IA, 44IB and 44IC of a three-phase commutator 44, respectively. In the three-phase commutator 44, each of the three-phase voltages Ea, Eb and Ec from the three-phase alternating-current generator 11 is commutated by a group of diodes 44D to produce a direct-current (DC) voltage DVr between a positive output terminal 44OP and a negative output terminal 44ON.

The direct-current voltage DVr obtained between the positive and negative output terminals 44OP and 44ON of the three-phase commutator 44 is supplied to input terminals 51A and 51B of a voltage stabilizing circuit 51. In the voltage stabilizing circuit 51, a direct-current voltage DVc having a stabilized constant value smaller than the value of the direct-current voltage DVr is produced based on the direct-current voltage DVr. The direct-current voltage DVc thus produced is derived between a positive output terminal 51P and a negative output terminal 51N of the voltage stabilizing circuit 51.

Positive and negative terminals of a secondary battery 45 or positive and negative terminals of a condenser 46 for accumulating electric power as shown with dot and dash lines in FIG. 11 are connected to the positive and negative output terminals 51P and 51N of the voltage stabilizing circuit 51, respectively. The direct-current voltage DVc obtained between the positive and negative output terminals 51P and 51N of the voltage stabilizing circuit 51 and a direct-current caused by the direct-current voltage DVc are supplied to the secondary battery 45 or the condenser 46 for accumulating electric power and subjected to charge therein.

The three-phase commutator 44 and the voltage stabilizing circuit 51 constitute a voltage to current convertor relative to the three-phase voltages Ea, Eb and Ec which are the output voltages induced respectively at the output terminals 11A, 11B and 11C of the three-phase alternating-current generator 11 based on the electric power generated by the three-phase alternating-current generator 11 and three-phase currents Ia, Ib and Ic which are output currents caused respectively by the three-phase voltages Ea, Eb and Ec to flow through the output terminals 11A, 11B and 11C of the three-phase alternating-current generator 11. The secondary battery 45 or the condenser 46 for accumulating electric power constitutes a load of the three-phase alternating-current generator 11. Accordingly, in the third embodiment shown in FIG. 11, the voltage to current convertor comprising the three-phase commutator 44 and the voltage stabilizing circuit 51 is connected between the output terminals 11A, 11B and 11C of the three-phase alternating-current generator 11 and the load constituted by the secondary battery 45 or the condenser 46 for accumulating electric power.

The voltage stabilizing circuit 51 is operative to supply the load constituted by the secondary battery 45 or the condenser 46 for accumulating electric power with the electric power required thereby based on the direct-current voltage DVc having the stabilized constant value smaller than the value of the direct-current voltage DVr, which is obtained by commutating at the three-phase commutator 44 the three-phase voltages Ea, Eb and Ec induced at the output terminals 11A, 11B and 11C of the three-phase alternating-current generator 11, and the direct-current caused by the direct-current voltage DVc. Accordingly, the value of each of the three-phase voltages Ea, Eb and Ec induced as the output voltages to the output terminals 11A, 11B and 11C of the three-phase alternating-current generator 11 and supplied to the three-phase commutator 44 to produce the direct-current voltage DVr can be arranged to be relatively large and the value of each of the three-phase currents Ia, Ib and Ic flowing as the output currents through the output terminals 11A, 11B and 11C of the three-phase alternating-current generator 11 can be arranged to be relatively small.

Under such a condition, the voltage to current convertor which comprises the three-phase commutator 44 and the voltage stabilizing circuit 51 and is connected between the output terminals 11A, 11B and 11C of the three-phase alternating-current generator 11 and the load constituted by the secondary battery 45 or the condenser 46 for accumulating electric power, is operative to supply the load constituted by the secondary battery 45 or the condenser 46 for accumulating electric power with the electric power obtained from the three-phase alternating-current generator 11 in such a manner that each of the three-phase voltages Ea, Eb and Ec induced as the output voltages to the output terminals 11A, 11B and 11C of the three-phase alternating-current generator 11 is arranged to be relatively high and each of the three-phase currents Ia, Ib and Ic flowing as the output currents through the output terminals 11A, 11B and 11C of the three-phase alternating-current generator 11 is arranged to be relatively small.

As aforementioned, in the three-phase alternating-current generator 11, the smaller each of the three-phase currents Ia, Ib and Ic flowing as the output currents through the output terminals 11A, 11B and 11C of the three-phase alternating-current generator 11 is, the less torque necessary for rotating the rotor (for example, the rotor 25 or 35 shown in FIGS. 3, 4, 6 and 7) of the three-phase alternating-current generator 11. Accordingly, in the third embodiment shown in FIG. 11 also, since each of the three-phase currents Ia, Ib and Ic flowing as the output currents through the output terminals 11A, 11B and 11C of the three-phase alternating-current generator 11 can be arranged to be relatively small, the torque necessary for rotating the rotor 25 or 35 of the three-phase alternating-current generator 11 can be effectively reduced. As a result, such a situation that the user who manually rotates the manual rotary driver 12 so as to rotate the rotor 25 or 35 of the three-phase alternating-current generator 11 is required to spend a relatively great deal of labor is avoided.

Figure 12:
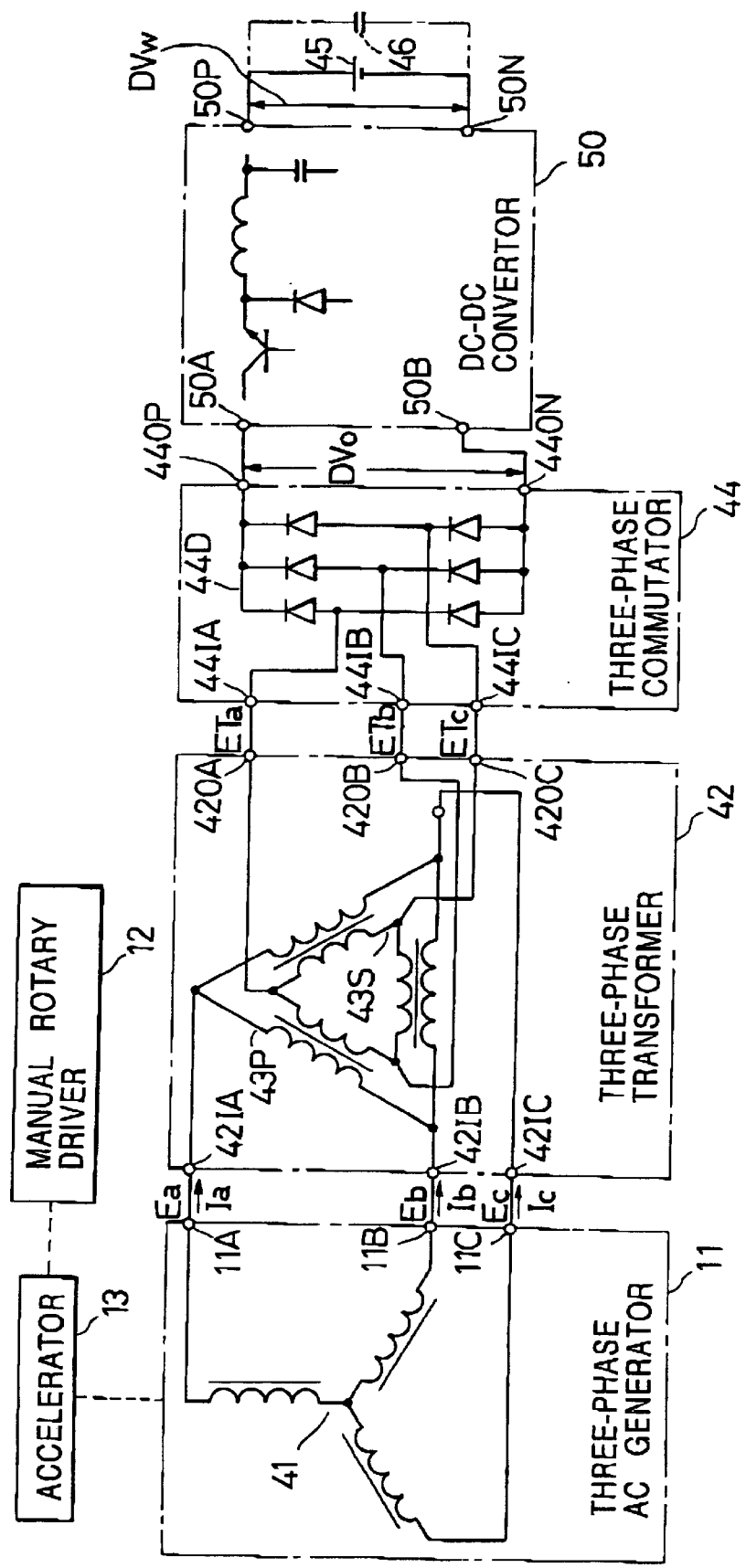
FIG. 12 is a circuit diagram including block indications and showing a fourth embodiment of electric power supplying apparatus according to the present invention.

FIG. 12 shows a fourth embodiment of electric power supplying apparatus according to the present invention.

Referring to FIG. 12, the fourth embodiment corresponds to a variation of the first embodiment shown in FIG. 1 in which a direct-current voltage convertor 50 as employed in the second embodiment shown in FIG. 10 is connected between the three-phase commutator 44 and the load constituted by the secondary battery 45 or the condenser 46 for accumulating electric power. In FIG. 12, elements, devices, portions, voltages and currents corresponding to those of FIGS. 1 and 10 are marked with the same references and further description thereof will be omitted.

In the fourth embodiment shown in FIG. 12, a three-phase alternating-current generator 11, a three-phase transformer 42 and a three-phase commutator 44 operate in the same manner as those employed in the first embodiment shown in FIG. 1 and thereby a direct-current voltage DVo obtained between positive and negative output terminals 440P and 440N of the three-phase commutator 44 based on three-phase voltages ETa, ETb and ETc derived to output terminals 420A, 420B and 420C of the three-phase transformer 42, respectively, is supplied to input terminals 50A and 50B of the direct-current voltage convertor 50. In the direct-current voltage convertor 50, the direct-current voltage DVo is once converted into a pulse train voltage. The pulse train voltage is subjected to a necessary level adjustment and then converted again into a direct-current voltage DVw having its value smaller than that of the direct-current voltage DVo. The direct-current voltage DVw thus produced is derived between a positive output terminal 50P and a negative output terminal 50N of the direct-current voltage convertor 50.

The direct-current voltage DVw obtained between the positive and negative output terminals 50P and 50N of the direct-current voltage convertor 50 and a direct-current caused by the direct-current voltage DVw are supplied to the secondary battery 45 or the condenser 46 for accumulating electric power and subjected to charge therein. Accordingly, in the fourth embodiment shown in FIG. 12, a voltage to current convertor comprising the three-phase transformer 42, the three-phase commutator 44 and the direct-current voltage convertor 50 is connected between the output terminals 11A, 11B and 11C of the three-phase alternating-current generator 11 and the load constituted by the secondary battery 45 or the condenser 46 for accumulating electric power.

With the fourth embodiment shown in FIG. 12 in which the voltage to current convertor comprising the three-phase transformer 42, the three-phase commutator 44 and the direct-current voltage convertor 50 is employed, the value of each of three-phase currents Ia, Ib and Ic flowing as output currents through output terminals 11A, 11B and 11C of the three-phase alternating-current generator 11 can be arranged to be much smaller than that in the first embodiment shown in FIG. 1, so that the load constituted by the secondary battery 45 or the condenser 46 for accumulating electric power is supplied very stably with electric power.

Figure 13:
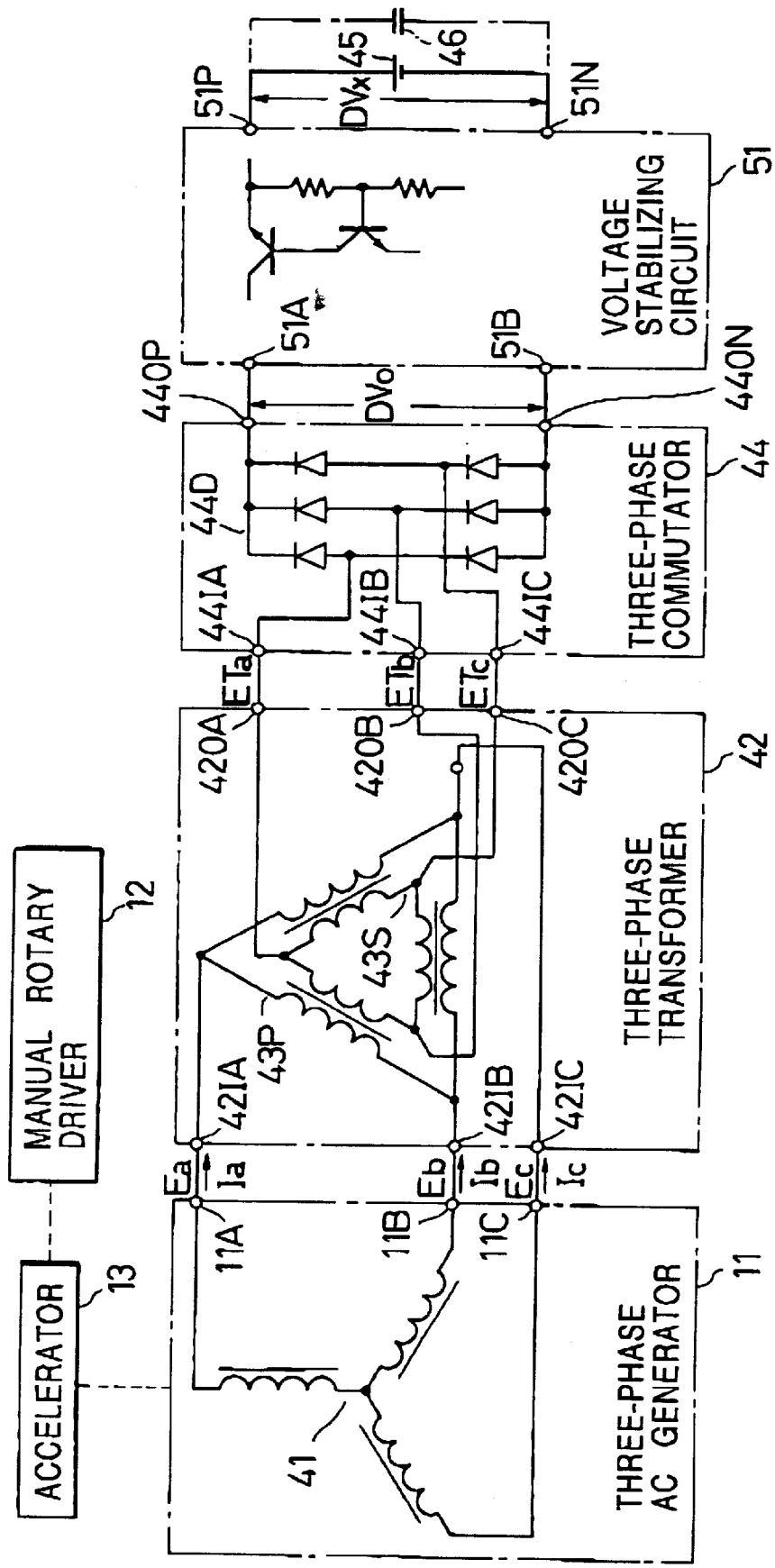
FIG. 13 is a circuit diagram including block indications and showing a fifth embodiment of electric power supplying apparatus according to the present invention.

FIG. 13 shows a fifth embodiment of electric power supplying apparatus according to the present invention.

Referring to FIG. 13, the fifth embodiment corresponds to another variation of the first embodiment shown in FIG. 1 in which a voltage stabilizing circuit 51 as employed in the third embodiment shown in FIG. 11 is connected between the three-phase commutator 44 and the load constituted by the secondary battery 45 or the condenser 46 for accumulating electric power. In FIG. 13, elements, devices, portions, voltages and currents corresponding to those of FIGS. 1 and 11 are marked with the same references and further description thereof will be omitted.

In the fifth embodiment shown in FIG. 13, a three-phase alternating-current generator 11, a three-phase transformer 42 and a three-phase commutator 44 operate in the same manner as those employed in the first embodiment shown in FIG. 1 and thereby a direct-current voltage DVo obtained between positive and negative output terminals 440P and 440N of the three-phase commutator 44 based on three-phase voltages ETa, ETb and ETc derived to output terminals 420A, 420B and 420C of the three-phase transformer 42, respectively, is supplied to input terminals 51A and 51B of the voltage stabilizing circuit 51. In the voltage stabilizing circuit 51, a direct-current voltage DVx having a stabilized constant value smaller than the value of the direct-current voltage DVo is produced based on the direct-current voltage DVo. The direct-current voltage DVx thus produced is derived between a positive output terminal 51P and a negative output terminal 51N of the voltage stabilizing circuit 51.

The direct-current voltage DVx obtained between the positive and negative output terminals 51P and 51N of the voltage stabilizing circuit 51 and a direct-current caused by the direct-current voltage DVx are supplied to the secondary battery 45 or the condenser 46 for accumulating electric power and subjected to charge therein. Accordingly, in the fifth embodiment shown in FIG. 13, a voltage to current convertor comprising the three-phase transformer 42, the three-phase commutator 44 and the voltage stabilizing circuit 51 is connected between the output terminals 11A, 11B and 11C of the three-phase alternating-current generator 11 and the load constituted by the secondary battery 45 or the condenser 46 for accumulating electric power.

With the fifth embodiment shown in FIG. 13 in which the voltage to current convertor comprising the three-phase transformer 42, the three-phase commutator 44 and the voltage stabilizing circuit 51 is employed, the value of each of three-phase currents Ia, Ib and Ic flowing as output currents through output terminals 11A, 11B and 11C of the three-phase alternating-current generator 11 can be arranged to be much smaller than that in the first embodiment shown in FIG. 1, so that the load constituted by the secondary battery 45 or the condenser 46 for accumulating electric power is supplied very stably with electric power.

Although the three-phase alternating-current generator 11 is employed in each of the first to fifth embodiments described above, it is to be understood that the electric power supplying apparatus according to the present invention is not limited to these embodiments but able to employ also a single-phase alternating-current generator. In the case where the single-phase alternating-current generator is employed, a single-phase transformer and a single-phase commutator are used in place of the three-phase transformer 42 and the three-phase commutator 44 employed in the first to fifth embodiments.

What is claimed is:

1. An electric power supplying apparatus comprising:

an alternating-current generator having a stator and a rotor, hand-actuated rotary driving means engaging the rotor of the alternating-current generator for driving the rotor to rotate so as to cause the alternating-current generator to generate electric power, and voltage and current converting means connected between an output of the alternating-current generator and a load for supplying the load with the electric power generated by the alternating-current generator in such a manner that an output voltage of the alternating-current generator is large relative to an output voltage of said voltage and current converting means and an output current of the alternating-current generator is small relative to an output current of said voltage and current converting means fed to the load;

wherein said voltage and current converting means comprises:
- a step-down transformer for reducing the output voltage of the alternating-current generator to produce a lowered transformed voltage and
- a convertor for converting the transformed voltage from the transformer to produce a direct-current voltage and supplying the direct-current voltage to the load.

2. The electric power supplying apparatus according to claim 1, wherein said voltage and current converting means comprises: a convertor for converting the output voltage of the alternating-current generator to produce a direct-current voltage; and a direct-current voltage convertor for reducing the direct-current voltage obtained from the convertor to produce a reduced direct-current voltage and supplying the reduced direct-current voltage to the load.

3. The electric power supplying apparatus according to claim 1, wherein said voltage and current converting means comprises: a convertor for converting the output voltage of the alternating-current generator to produce a direct-current voltage; and a voltage stabilizing circuit for producing a stabilized constant voltage based on the direct-current voltage obtained from the convertor and supplying the stabilized constant voltage to the load.

4. The electric power supplying apparatus according to claim 1, wherein said voltage and current converting means comprises: a transformer for reducing the output voltage of the alternating-current generator to produce a transformed voltage; a convertor for converting the transformed voltage obtained from the transformer to produce a direct-current voltage; and a direct-current voltage convertor for reducing the direct-current voltage obtained from the convertor to produce a reduced direct-current voltage and supplying the reduced direct-current voltage to the load.

5. The electric power supplying apparatus according to claim 1, wherein said voltage and current converting means comprises: a transformer for reducing the output voltage of the alternating-current generator to produce a transformed voltage; a convertor for converting the transformed voltage obtained from the transformer to produce a direct-current voltage and a voltage stabilizing circuit for producing a stabilized constant voltage based on the direct-current voltage obtained from the convertor and supplying the stabilized constant voltage to the load.

6. The electric power supplying apparatus according to claim 1, wherein said alternating-current generator comprises a three-phase alternating-current generator.

7. The electric power supplying apparatus according to claim 1, wherein said rotary driving means comprises a manual rotary driver rotated manually by a user and an accelerator for increasing a rotation rate of the manual rotary driver and for transmitting an increased rotation rate of the manual rotary driver to the rotor of the alternating-current generator.

* * * * *